(12) United States Patent
Jönsson et al.

(10) Patent No.: US 11,631,183 B2
(45) Date of Patent: Apr. 18, 2023

(54) METHOD AND SYSTEM FOR MOTION SEGMENTATION

(71) Applicant: Axis AB, Lund (SE)

(72) Inventors: Jimmie Jönsson, Lund (SE); Johan Jeppsson Karlin, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/485,514

(22) Filed: Sep. 27, 2021

(65) Prior Publication Data

US 2022/0114736 A1 Apr. 14, 2022

(30) Foreign Application Priority Data

Oct. 14, 2020 (EP) .................................... 20201686

(51) Int. Cl.
*G06T 7/00* (2017.01)
*G06T 7/223* (2017.01)
(Continued)

(52) U.S. Cl.
CPC .............. *G06T 7/223* (2017.01); *G06T 5/002* (2013.01); *G06T 7/215* (2017.01)

(58) Field of Classification Search
CPC ......... G06T 7/223; G06T 5/002; G06T 7/215; G06T 2207/10016; G06T 2207/20016; G06T 2207/20021; G06T 7/11; G06T 5/001; G06T 7/254; G06T 2207/20012; G06T 2207/20182; G06T 2207/20024; G06T 7/20; G06T 7/174; G06T 7/32; G06T 7/248; G06T 3/4046; G06T 9/002; G06T 2207/20081; G06T 2207/20084; H04N 5/23254; H04N 5/144; H04N 19/51; H04N 19/53; H04N 19/147; H04N 19/0157; H04N 19/597; G06K 9/6201; G06K 9/629; G06K 9/6256; G06K 9/623; G06K 7/1482; G06V 10/50; G06V 40/162; G06V 20/46; G06V 20/40; G06V 10/454; G06V 10/82; G06V 30/18057; G06N 3/02; G06N 3/08–088; G06N 3/0445; G06N 3/0454; G06N 7/00; G06N 20/00

See application file for complete search history.

(56) References Cited

U.S. PATENT DOCUMENTS 6,097,832 A 8/2000 Guillotel et al.
6,101,276 A * 8/2000 Adiletta ............... H04N 19/149
375/E7.22

(Continued)

*Primary Examiner* — Jose L Couso
(74) *Attorney, Agent, or Firm* — Xsensus LLP

(57) ABSTRACT

The present disclosure relates to a method of motion segmentation (100) in a video stream. The method comprises the steps of: acquiring (101) a sequence of image frames; dividing (102) a first frame (401) into a plurality of image blocks (403); comparing (103) each image block (403) against a corresponding reference image block (404) and providing a measure of dissimilarity; for image blocks having a measure of dissimilarity less than a threshold: discarding (104*a*) the image blocks, and for image blocks having a measure of dissimilarity greater than the threshold: keeping (104*b*) the image blocks and further dividing the image blocks into a new plurality of image blocks (405); repeating the steps of dividing (102) and comparing (103) until a stop condition is met (105*a*); generating (106) a motion mask (407) indicating areas of movement (408).

15 Claims, 6 Drawing Sheets

(51) Int. Cl.
*G06T 7/215* (2017.01)
*G06T 5/00* (2006.01)

(56) References Cited

U.S. PATENT DOCUMENTS

| | | |
|---|---|---|
| 7,095,786 B1 | 8/2006 | Schonfeld et al. |
| 10,958,869 B1* | 3/2021 | Chi ..................... G06N 3/0454 |
| 2002/0044607 A1 | 4/2002 | Koga et al. |
| 2002/0063702 A1* | 5/2002 | Wada ....................... H04N 5/20 348/E5.073 |
| 2003/0081836 A1* | 5/2003 | Averbuch ............... G06T 7/174 382/199 |
| 2003/0118214 A1* | 6/2003 | Porikli ..................... G06T 7/20 382/107 |
| 2004/0131249 A1* | 7/2004 | Sandrew ............... G06T 11/001 382/254 |
| 2004/0151342 A1* | 8/2004 | Venetianer ................ G06T 7/11 382/199 |
| 2005/0275723 A1* | 12/2005 | Sablak ................... G06T 7/215 348/169 |
| 2007/0195993 A1 | 8/2007 | Chen et al. |
| 2009/0136092 A1 | 5/2009 | Springer et al. |
| 2009/0279788 A1 | 11/2009 | Murata et al. |
| 2011/0142283 A1* | 6/2011 | Huang ................... G06T 7/254 382/103 |
| 2012/0224749 A1* | 9/2012 | Chen ....................... G06T 7/223 382/107 |
| 2013/0100314 A1* | 4/2013 | Li ....................... H04N 5/23254 348/229.1 |
| 2015/0243033 A1* | 8/2015 | Uemori ................. G06T 7/0012 382/103 |
| 2015/0350547 A1* | 12/2015 | Nariani-Schulze ......................... H04N 5/23254 348/208.1 |
| 2016/0110882 A1 | 4/2016 | Paik et al. |
| 2016/0125616 A1* | 5/2016 | Lee ..................... G06N 3/0454 |
| 2016/0225161 A1* | 8/2016 | Hepper .................... G06T 7/223 |
| 2018/0315196 A1* | 11/2018 | Socek ................... G06T 7/0012 382/103 |
| 2018/0315199 A1* | 11/2018 | Socek ..................... G06T 7/223 382/107 |
| 2019/0035092 A1 | 1/2019 | Yeh et al. |
| 2020/0265557 A1* | 8/2020 | Choi ........................ G06T 7/223 |
| 2020/0336715 A1* | 10/2020 | Hu ....................... G06T 11/001 382/254 |

* cited by examiner

METHOD AND SYSTEM FOR MOTION SEGMENTATION

CROSS-REFERENCE TO RELATED APPLICATION

This application claims priority to European Patent Application No. 20201686.1, filed on Oct. 14, 2020, the disclosure of which is incorporated herein by reference in its entirety.

The present disclosure relates to computer-implemented methods and a system for motion segmentation in image frames, in particular in a sequence of image frames from an image sensor of a camera. A computer program for the same purpose is also disclosed.

BACKGROUND

Image processing generally refers to any processing that is applied to any image. The processing typically involves filtering or enhancing images using various types of functions and algorithms. The images are typically images captured by a video camera or a still camera, and may include, for example surveillance cameras, digital network cameras, pan/tilt/zoom (PTZ) cameras, outdoor cameras etc.

When processing a sequence of image frames from a camera, for example a sequence of image frames in a video stream, it may be beneficial to know which areas in the image sequence that include motion, and which do not. As an example, for noise filtering, it may be beneficial or even important to know what parts of the image that are moving in order to control how hard different areas should be filtered.

A typical issue in image processing is to correctly determine movement at a suitable level for a given purpose. One example of a method for determining movement in a sequence of image frames involves a pixel-by-pixel comparison between adjacent image frames. Pixels which differ more than a certain threshold with respect to a previous image frame are defined as including motion. While this method can be accurate, the measure is typically also sensitive to noise. The process is also computational heavy, thus not necessarily suitable for real-time processing of video. Other existing methods focus on identifying and tracking objects to determine if they are moving. Such methods may have other drawbacks, such as difficulties in identifying and tracking the objects and inaccuracy due to a changing background.

There is thus a need for an improved and efficient solution of movement detection in processing of image frames, where the method can easily be adapted to conditions such as processing resources, required speed and/or different precision levels of motion segmentation.

SUMMARY

One objective of the present disclosure is to provide a method and a system for motion segmentation in image frames, which is particularly suitable for performing substantially real-time motion segmentation that can be adapted to the operating conditions, required precision in motion segmentation and/or to available processing resources. A first aspect of the present disclosure relates to a computer-implemented method of motion segmentation in a video stream, the method comprising the steps of:

a) acquiring a sequence of image frames from a camera;
b) dividing a first image frame from the sequence of image frames into a plurality of image blocks;
c) for each image block of the plurality of image blocks, comparing the image block against a corresponding reference image block of a second image frame from the sequence of image frames to provide a measure of dissimilarity between the image block and the reference image block;
d) for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the image blocks into a new plurality of image blocks;
e) repeating steps c)-d) until a stop condition is met;
f) generating a motion mask indicating areas of movement in the sequence of image frames based on the new plurality of image blocks; and
g) performing further image processing, such as noise filtering, exposure and/or coloring, based on the motion mask.

Instead of determining movement between the first image frame and the second image frame by comparing each pixel, the image is divided into a plurality of image blocks, which are processed separately. Preferably, the same division is applied to the first image frame and the second image frame in order to compare corresponding blocks of image frames captured at different times. As would be understood by a person skilled in the art, the step of comparing an image block of the first image frame against a corresponding reference image block of a second image frame may involve a number of possible comparison methods, including, for example, average pixel comparison. The comparison at block level involves the provision of a measure of dissimilarity between the image block and the reference image block. The measure of dissimilarity can then be compared against a dissimilarity threshold. If the measure of dissimilarity is less than the threshold, which indicates that there is no or little movement between the first image frame and the second image frame within the boundaries of the image block, the image block is categorized as an image block with no or limited movement and the image block is discarded from further analysis. If the measure of dissimilarity is greater than the threshold, which indicates that there is movement between the first image frame and the second image frame within the boundaries of the image block, the image block is categorized as an image block with movement and the image block is kept in the loop for further analysis. When all image blocks have been categorized as image blocks having either movement or no or limited movement, the image blocks with movement are further divided into a new plurality of smaller image blocks. A comparison between image blocks of the first image frame and the second image frame can then be performed for the new plurality of image blocks as described above. The steps of dividing the image blocks, comparing against a threshold and categorizing the image blocks can be repeated until a stop condition is met. The stop condition may be, for example, that a predefined number of iterations have been performed or that a maximum processing time has been used for the task of motion segmentation.

One advantage of the presently disclosed method of motion segmentation is that is flexible and easily adaptable to conditions, such as processing resources, required speed and time for providing the motion mask and how detailed the motion segmentation needs to be. As an example, by adjusting the threshold level, the number of image blocks that will be discarded and kept can be influenced by adjusting the threshold level. While this may be useful for, for example, adjusting noise sensitivity, it may at the same time be used as a means of discarding fewer or more image blocks. A further example relates to the division into a plurality or new plurality of image blocks. Dividing each image block into four (2×2) new blocks may be suitable for certain applications, whereas for other applications it is more useful to divide the image blocks into 9 (3×3) or 16 (4×4) new image blocks. Such decisions may also be adjusted during the motion segmentation process depending on, for example, the number of discarded blocks, remaining process time before a motion mask needs to be delivered, general level of dissimilarly, etc.

The presently disclosed method of motion segmentation thus provides an iterative method that is both flexible and as fast as required by the application it is used in. The method can be performed quickly with a rough result or be performed during a longer time and thus provide a more detailed motion mask. In some applications the processing of image frames may be real-time or substantially real-time. The presently disclosed method of motion segmentation may therefore be performed substantially real-time, wherein the generated motion mask is used for, for example, noise filtering or for controlling setting of the camera and/or image sensor, such as exposure time and gain. A purpose of the exposure control can be to adapt the exposure to the fastest moving object in a scene to avoid motion blur. The image processing method may thus be performed repeatedly for a sequence of image frames acquired from an image sensor.

The present disclosure further relates to an image processing system comprising:
at least one camera for capturing sequential image frames; and
a processing unit or a hardware accelerator configured to perform the steps of:
  i. acquiring a sequence of image frames from the camera;
  ii. dividing a first image frame from the sequence of image frames into a plurality of image blocks;
  iii. for each image block of the plurality of image blocks, comparing the image block against a corresponding reference image block of a second image frame from the sequence of image frames to provide a measure of dissimilarity between the image block and the reference image block;
  iv. for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the image blocks into a new plurality of image blocks; and
  v. repeating steps iii-iv until a stop condition is met and providing a resulting motion segmentation indicating areas of movement in the sequence of image frames based on the new plurality of image blocks.

The invention further relates to a computer program having instructions, which, when executed by a computing device or computing system, cause the computing device or system to carry out any embodiment of the presently disclosed method of motion segmentation in a video stream or method of motion segmentation in image frames. Computer program in this context shall be construed broadly and include, for example, a computer program to be run on a PC or a computer program adapted to run as a part of a surveillance system or any system comprising monitoring devices arranged in a network.

BRIEF DESCRIPTION OF DRAWINGS

The invention will in the following be described with reference to the accompanying drawings, which are exemplary and not limiting to the presently disclosed method and system for motion detection.

DETAILED DESCRIPTION

Figure 1:
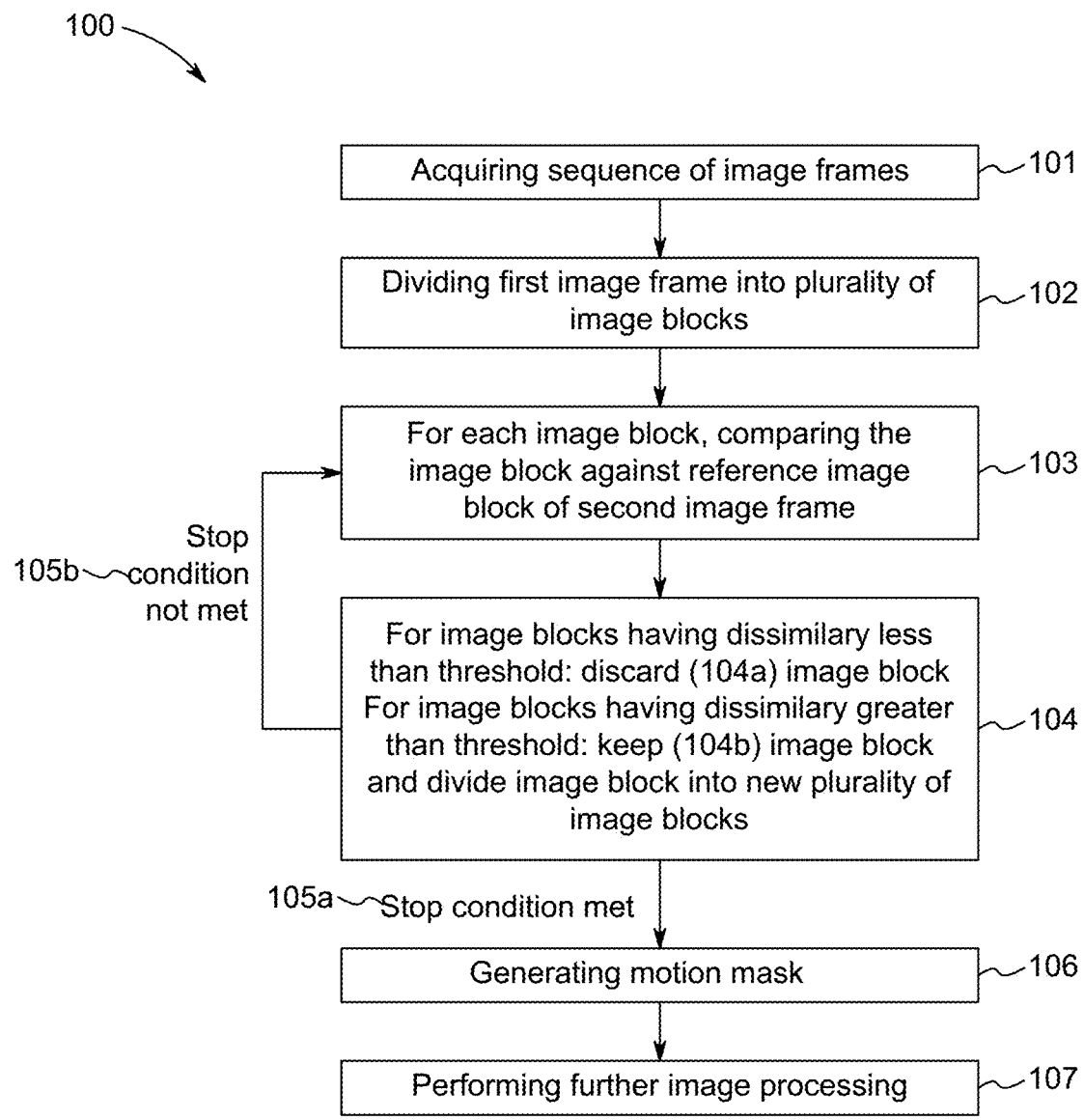
FIG. 1 shows a flow chart of one embodiment of the presently disclosed method of motion segmentation in a video stream.

The present disclosure relates to, according to a first embodiment, a method of motion segmentation in a video stream. A video stream in the context of the present disclosure may be seen as a sequence of image frames. The method of motion segmentation may be applied to any two of the image frames in the sequence of image frames. The second image frame may be an image frame temporally preceding the first image frame, or a reference image frame. The reference image frame may be a background image or a generated image. Moreover, the reference image frame may be a moving average, wherein areas that have no, or limited, movement are not updated. Such a reference image frame may also be a spatially filtered reference image frame. The use of a spatially filtered reference image in the context of the present disclosure may improve the signal-to-noise ratio (SNR) in the comparison in the presently disclosed method of motion segmentation in a video stream. The sequence of image frames will typically be acquired from a camera such as a digital camera. Hence, the method may, optionally, comprise a first step of acquiring a sequence of image frames from a camera, which may any suitable camera or monitoring device. The image frames may consequently be sequential camera images.

The method further comprises the step of dividing a first image frame from the sequence of image frames into a plurality of image blocks. An image block may in this regard be seen as a subarea of the first image frame. As an example, the first image frame may be divided into four image blocks.

In a further step, for each image block of the plurality of image blocks, the image block is compared against a corresponding reference image block of a second image frame from the sequence of image frames. In practice this means that the second image frame also is divided into corresponding reference image blocks. The image blocks and reference image blocks are compared one by one, either sequentially or in parallel. The method may further comprise the step of providing a measure of dissimilarity between each image block and corresponding reference image. Different image analysis techniques are available for this purpose, which is described in further detail below. The measure of dissimilarity may provide information about possible motion in the image block pair. For image blocks having a measure of dissimilarity less than a threshold it may be assumed that there is no or limited movement. These image blocks may therefore be discarded and excluded from further analysis. For image blocks having a measure of dissimilarity greater than the threshold it can be assumed that there is movement within the image block or that something else besides noise has happened in the image block between the first and second image frame. These image blocks may therefore be kept for further analysis.

Next step in the method is to further divide the image blocks having a measure of dissimilarity greater than the threshold into a new plurality of image blocks. This also means that for the image blocks having a measure of dissimilarity less than the threshold, no further block division is needed, i.e. only the image blocks having a measure of dissimilarity greater than the threshold are divided. The image blocks having a measure of dissimilarity less than the threshold are discarded and categorized as blocks with no or limited movement. 'Greater' (than a threshold) in the context of the present disclosure may refer to 'greater or equal', i.e. including the case where the measure of dissimilarly is the same as the threshold. Similarly, 'less' (than a threshold) may include or exclude the case in which the measure of dissimilarly is the same as the threshold. The division is done for both the first image frame and the second frame in order to have new pairs of image blocks to compare. The new plurality of image blocks now takes the place of the image blocks referred to in the comparison described above. Thus, the resulting 'new plurality of image blocks' in step d) in one round may be the 'image blocks' that are used for comparison in step c) in the next round. In other words, the sequence can be seen as 1) an image frame is divided into a plurality of image blocks, 2) some image blocks are selected based on a comparison and then further divided into a new plurality of image blocks, 3) as the division and comparison is iterated, for every new round the 'new plurality of image blocks' of one round "become" the 'image blocks' that are compared in the next round. A new round of comparison starts for the new plurality of image blocks and, again, image blocks having a measure of dissimilarity less than a threshold are discarded as blocks with no or limited movement, whereas image blocks having a measure of dissimilarity greater than the threshold are kept as blocks with movement. These blocks may then be further divided, and so forth, until a stop condition has been met. The stop condition may be, for example, that a predefined number of iterations have been performed or that a maximum processing time has been used for the task of motion segmentation, or any other useful stop condition.

Based on the image blocks that have a measure of dissimilarity greater than the threshold after the last iteration, i.e. the image blocks having movement at the smallest analyzed block size, a motion mask can be generated. Based on the motion mask, other tasks, such as such as noise filtering, exposure, coloring and/or controlling settings of the image sensor and/or of the camera can be performed.

The present disclosure relates to, according to a second embodiment, a method of motion segmentation in image frames, the method comprising the steps of:

a) dividing a first image frame into a plurality of image blocks;
b) for each image block of the plurality of image blocks, comparing the image block against a corresponding reference image block of a second image frame to provide a measure of dissimilarity between the image block and the reference image block;
c) for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the kept image blocks into a new plurality of image blocks; and
d) repeating steps b)-c) until a stop condition is met; and providing a resulting motion segmentation indicating areas of movement in the image frames based on the new plurality of image blocks after the last iteration.

Within the scope of the present disclosure, any disclosed embodiment can be applied to any of the above described method of motion segmentation in a video stream and method of motion segmentation in image frames.

In any of the embodiments, at least the first image frame, preferably also the second image frame, is/are unprocessed image sensor data. The flexibility and possibility to perform the disclosed motion segmentation method quickly makes it suitable for operating at raw image data and using the generated motion masks for further processing of the image frames.

Image Blocks, Block Division

Figure 5:
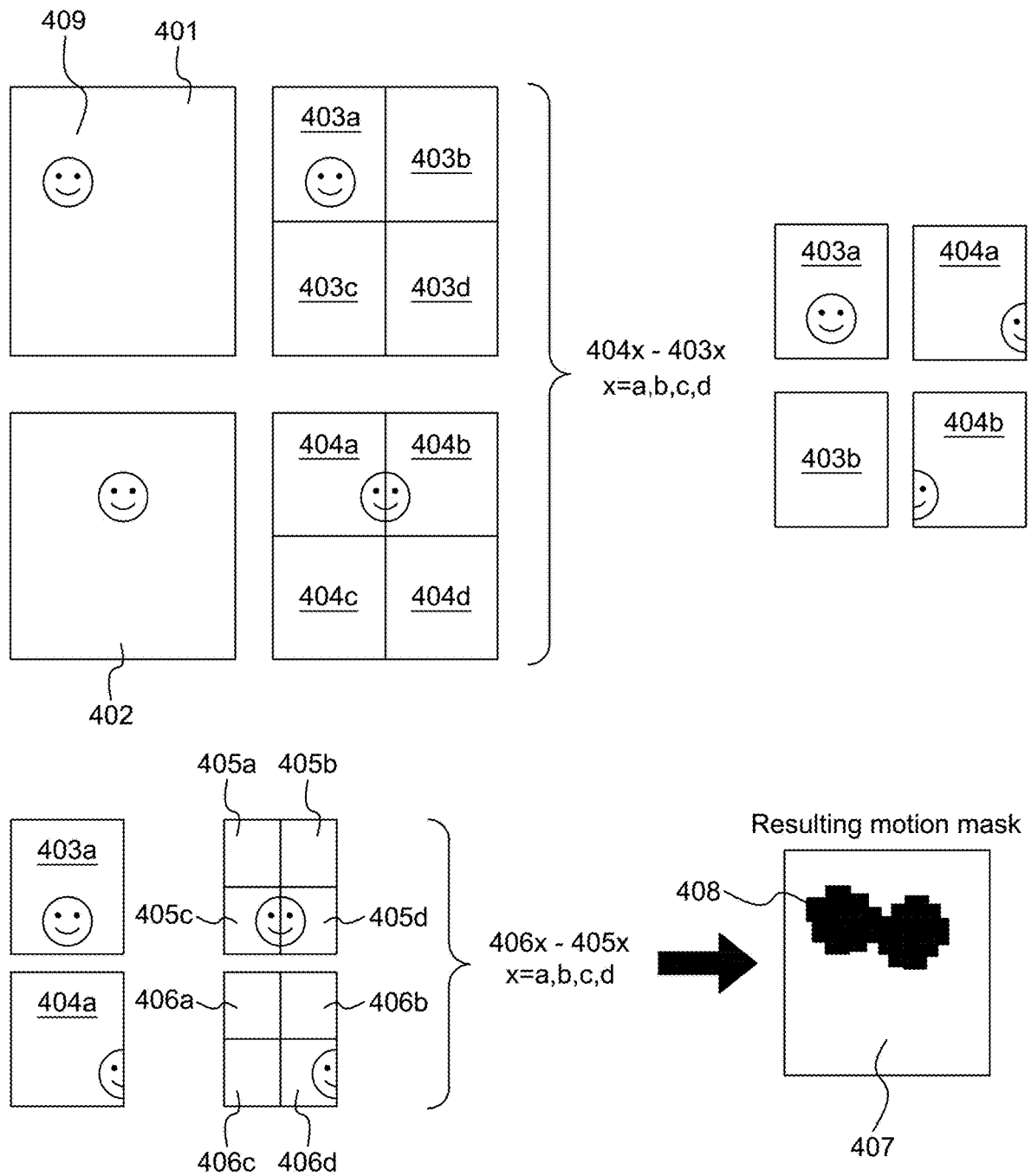
FIG. 5 shows an example of a process of detecting motion between two image frames.

An 'image block' in the context of the present disclosure refers to a subarea of an image frame or other image block. An image frame has a given number of pixels, such as 1920×1080 pixels or 3840×2160 pixels. According to the present disclosure, an image frame may be divided into image blocks. If an image frame of 1920×1080 pixels is, for example, divided into four equal image blocks, each block will be 480×270 pixels. In one embodiment of the presently disclosed method of motion segmentation the step of dividing the image frame into image blocks (and similarly the step of further dividing the image blocks into a new plurality of image blocks) comprises no overlap, or substantially no overlap, between the image blocks. As illustrated in the example of FIG. 5, the first image frame (401) is divided into four image blocks (403a; 403b; 403c; 403d). As can be seen the four image blocks (403a; 403b; 403c; 403d) together constitute the first image frame since there is no overlap. However, using overlapping image blocks and/or having gaps between the image blocks is not excluded as an option for the presently disclosed method of motion segmentation. The division can be any suitable division resulting in new image blocks larger than one pixel. Preferably the image frames are divided into 2-10 image blocks. In the further divisions, each image block may be further divided into 2-10 new image blocks, and so forth. In one embodiment image frames or image blocks are always divided into 3×3 blocks in order to always have a middle block surrounded by edge blocks. In an alternative embodiment image frames or image blocks are always divided into 2×2 blocks. An even simpler division would be to divide the image frames or image blocks in two halves i.e. 1×2/2×1 blocks. According to one embodiment, the image blocks have equal size. Alternatively, the image frames and/or image blocks are divided into image blocks, wherein the size of the blocks depend on properties of the image frames/image blocks. As an example, it can be envisaged that a background has a given colour, which may be the case for, for example, a generally blue sky. Accordingly, the image blocks for such regions may be configured to larger than other parts of the image frames in the dividing process. Similarly, if detailed movement can be expected in some areas of the image frame based on a preliminary analysis of the image frame, the block size may bet set smaller for such regions. Further, a predefined region such as a region of interest may be handled different than a surrounding (background) region. The region of interest may be set with a smaller block size for the division of the region of interest.

According to one embodiment, the step of dividing the image frame into image blocks (or further dividing image blocks to new image blocks) is performed without taking into account content of the image frames or image blocks. By applying a simple, predetermined division of the area represented by the pixels, the splitting part of the presently disclosed method can be made very fast. Therefore, according to one embodiment of the presently disclosed method of motion segmentation, the step of dividing the first image frame into a plurality of image blocks, and/or further dividing image blocks into new image blocks, is performed based on predefined or configurable image block sizes, without analysis of the first camera image.

A 'pair of image blocks' or 'image block pair' refers to an image block of one image frame and a corresponding image block of another image frame. If, for example, the first image frame has been divided into 2×2 image blocks and the second image frame has been divided into 2×2 reference image blocks, there are four image block pairs. The concept is demonstrated in FIG. 5. The pairs of image blocks in this example are: 403a/404a, 403b/404b, 403c/404c and 403d/404d.

Comparison and Threshold Level

Preferably, the image blocks and reference image blocks are compared one by one. The processing may be executed in parallel since the comparisons are independent of each other. In the step of providing a measure of dissimilarity between each image block and corresponding reference image, different techniques and approaches can be used, as would be understood by a person skilled in the art. According to one embodiment of the presently disclosed method of motion segmentation the measure of dissimilarity is a predefined measure of dissimilarity. One example is to compute or extract an average pixel value for the image block being compared and compare against the average pixel value of the corresponding reference image block. If the difference between the values is greater than a certain threshold the image can be categorized as a block with movement. Another method would be pixel-to-pixel comparison. Sum of pixel differences by accumulating pixel differences or sum of squared differences may be further alternatives. Therefore, in one embodiment, the step of comparing the image block against a corresponding reference image block of the second camera image comprises a pixel-to-pixel comparison, or a comparison of an average of groups of pixels or a comparison of a sum of all pixels in the image block. A further option may be comparison of histograms of the image blocks. Generally, the step of measuring the dissimilarity between image block is not limited to the examples provided in the present disclosure.

According to the presently disclosed method of motion segmentation the measure of dissimilarity may be compared against a threshold. The threshold may be set based on an assumed or measured general noise level in the image frames. The noise level is typically dependent on parameters such as image sensor type and pixel intensity.

According to one embodiment, the threshold level that is used can be adjusted between the iterations. This can be done to adapt to the noise level but also to adjust the sensitivity regarding motion so that a fewer or greater number of movements are captured by the method.

Motion Mask

The presently disclosed motion segmentation may produce a motion mask showing which areas that contain motion and which do not contain motion. The motion mask may thus be a binary motion mask. Alternatively, the motion mask may comprise a number of levels of motion in order to provide an operator or user with information about the level of motion in different areas. The motion mask may, for example, be presented as a heat map. The motion mask can be used as input to noise filtering or to other image processing algorithms, such as exposure control.

The motion mask may be generated such that the motion mask reflects the new plurality of image blocks of the last iteration. In each iteration a number of image blocks can be discarded as being blocks with no or limited movement. Consequently, this is then also reflected in the motion mask. As further iterations are performed, further image blocks on a more refined level are sorted away as blocks having limited or no movement. The image blocks that have not been categorized as blocks having limited or no movement when the stop condition is met and the iterations stop can be categorized as image blocks having movement, which may be reflected in the motion mask.

Further Improvements and Embodiments

As stated, once the image blocks and corresponding reference image blocks have been compared and a measure of dissimilarity between the image block and the reference image block has been calculated or extracted, some image blocks are divided into new image blocks. In one embodiment the step of dividing the image blocks having a measure of dissimilarity greater than the threshold is not done for all image blocks having a measure of dissimilarity greater than the threshold. In a system having limited processing resources, or wherein a motion mask has to be provided even faster, it is possible to select only a limited number of image blocks that should be further divided and processed using the presently disclosed algorithm. According to one embodiment a maximum number of image blocks can be set and the image blocks can then be prioritized such that the image blocks having the greatest measure of dissimilarity are selected for further division and iteration. An alternative way of controlling the number of image blocks for further division is to adjust the threshold. In one embodiment the threshold is adjusted after each iteration based on the measure of dissimilarity for the pairs of image blocks.

A further possibility when selecting a limited number of image blocks that should be further divided and processed is to prioritize certain regions. For example, it is possible that movement in certain regions of the image frames are more (or less) important to have represented in the resulting motion mask. As an example, a central region of the image may be more important for the motion mask than peripheral regions. These areas may then be associated with a higher (or lower) priority than other areas. In one embodiment step c) (i.e. for each image block of the plurality of image blocks, comparing the image block against a corresponding reference image block of a second image frame from the sequence of image frames to provide a measure of dissimilarity between the image block and the reference image block) is only performed for a selected number of image blocks, wherein the image blocks within one or more predefined image areas are prioritized. Alternatively, step c) is only performed for a selected number of image blocks, wherein the image blocks are prioritized based on predefined image features, such as predefined colors and/or patterns, of the image blocks.

Image Processing System

The present disclosure further relates to an image processing system or a motion segmentation system. The system comprises a processing unit and/or a hardware accelerator configured to perform any embodiment of the presently disclosed method of motion segmentation in a video stream or method of motion segmentation in image frames. According to one embodiment the processing unit or a hardware accelerator is configured to perform the steps of:
  i. acquiring a sequence of image frames from an image sensor;
  ii. dividing a first image frame from the sequence of image frames into a plurality of image blocks;
  iii. for each image block of the plurality of image blocks, comparing the image block against a corresponding reference image block of a second image frame from the sequence of image frames to provide a measure of dissimilarity between the image block and the reference image block;
  iv. for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the image blocks into a new plurality of image blocks; and
  v. repeating steps iii-iv until a stop condition is met and providing a resulting motion segmentation indicating areas of movement in the sequence of image frames based on the new plurality of image blocks.

The image processing may further comprise an image sensor, and typically a camera comprising the image sensor.

The processing unit or a hardware accelerator, or further processing unit, may be further configured to perform the steps of:
  vi. generating a motion mask based on the new plurality of image blocks; and
  vii. adjusting settings of the at least one camera, and/or performing further image processing, such as noise filtering, exposure and/or coloring, based on the motion mask.

DETAILED DESCRIPTION OF DRAWINGS

The invention will in the following be described in greater detail with reference to the accompanying drawings. The drawings are exemplary and are intended to illustrate some of the features of the presently disclosed method and system for motion detection, and are not to be construed as limiting to the presently disclosed invention.

FIG. 1 shows a flow chart of one embodiment of the presently disclosed method of motion segmentation in a video stream (100). The method comprises the steps of: acquiring (101) a sequence of image frames from a camera; dividing (102) a first image frame from the sequence of image frames into a plurality of image blocks; for each image block of the plurality of image blocks, comparing (103) the image block against a corresponding reference image block of a second image frame from the sequence of image frames to provide a measure of dissimilarity between the image block and the reference image block; for image blocks having a measure of dissimilarity less than a threshold: discarding (104a) the image blocks as being blocks with no or limited movement; and for image blocks having a measure of dissimilarity greater than the threshold: keeping (104b) the image blocks as being blocks with movement and further dividing the image blocks into a new plurality of image blocks. The steps of dividing the image frames or further diving the image blocks, comparing the image blocks and categorizing the image blocks are repeated until a stop condition is met (105a). Hence, if the stop condition is not met (105b), the new plurality of image blocks is used as the image blocks in the step of comparing (103) the image block against a corresponding reference image block. The method further comprises the steps of: generating (106) a motion mask indicating areas of movement in the sequence of image frames based on the new plurality of image blocks; and performing (107) further image processing, such as noise filtering, exposure and/or coloring, based on the motion mask.

Figure 2:
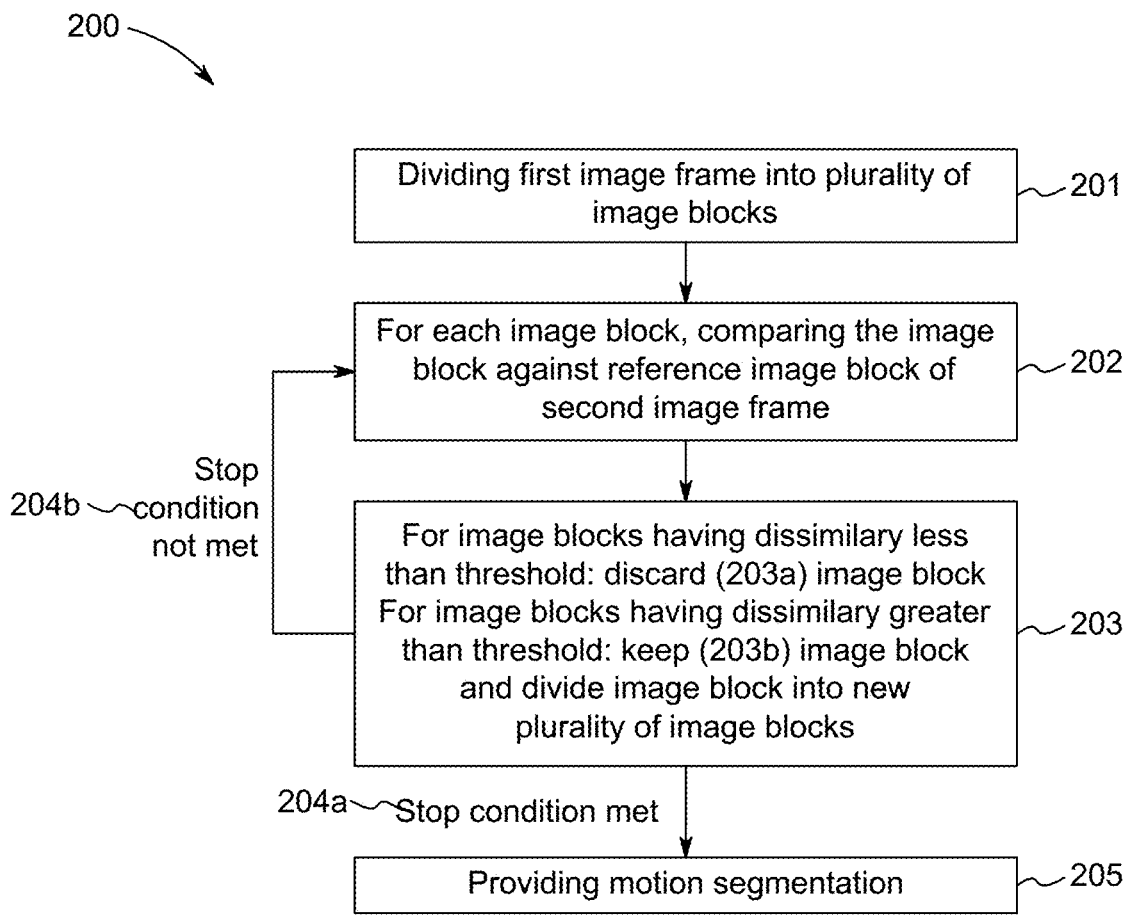
FIG. 2 shows a flow chart of one embodiment of the presently disclosed method of motion segmentation in image frames.

FIG. 2 shows a flow chart of one embodiment of the presently disclosed method of motion segmentation in image frames (200). The method comprises the steps of: dividing (201) a first image frame into a plurality of image blocks; for each image block of the plurality of image blocks, comparing (202) the image block against a corresponding reference image block of a second image frame to provide a measure of dissimilarity between the image block and the reference image block; for image blocks having a measure of dissimilarity less than a threshold: discarding (203a) the image blocks as being blocks with no or limited movement; and for image blocks having a measure of dissimilarity greater than the threshold: keeping (203b) the image blocks as being blocks with movement and further dividing the kept image blocks into a new plurality of image blocks. The steps of dividing the image blocks, comparing the image blocks and categorizing the image blocks are repeated until a stop condition is met (204a). When the stop condition is met (204a) a resulting motion segmentation indicating areas of movement in the image frames based on the new plurality of image blocks after the last iteration is provided (205).

Figure 3:
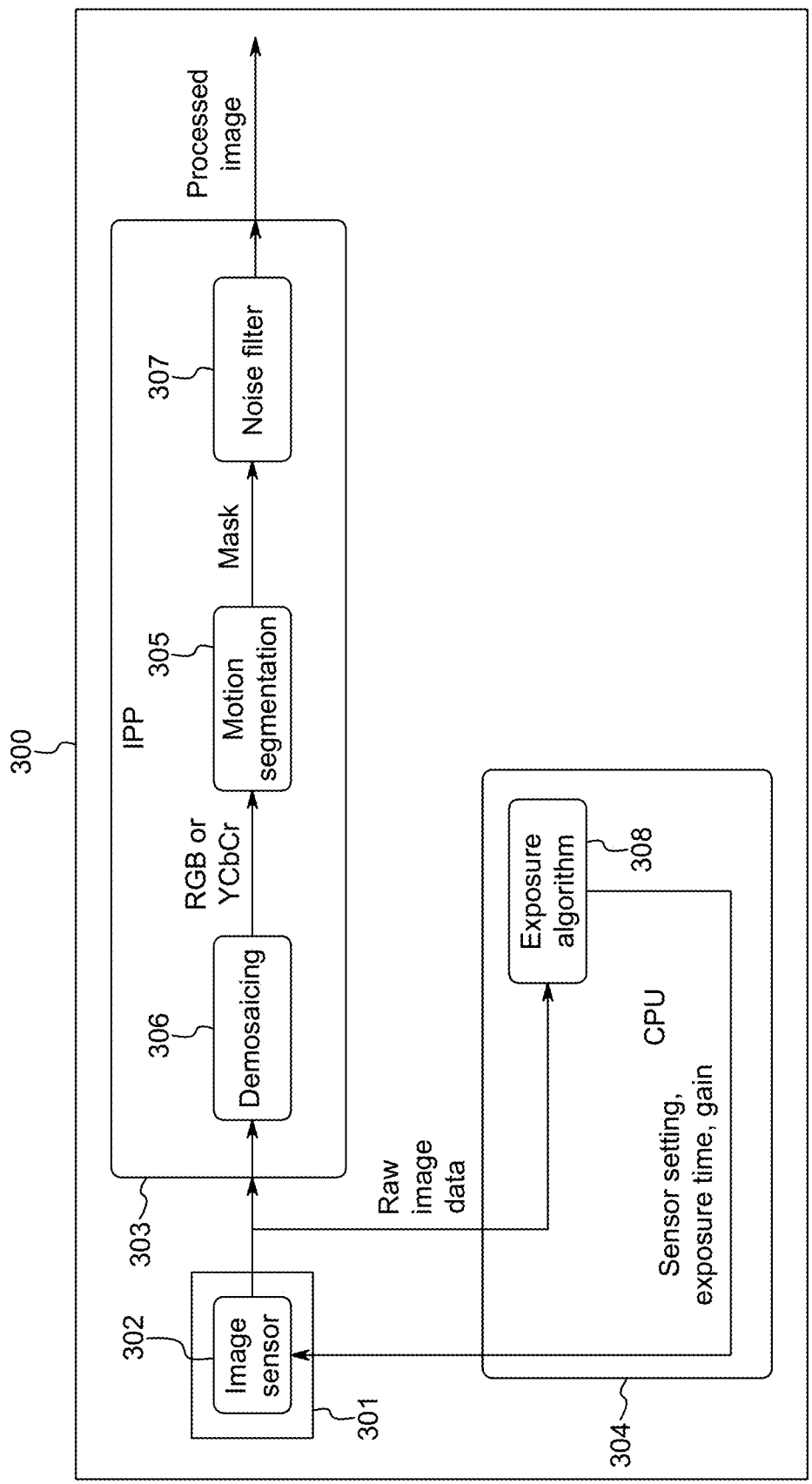
FIG. 3. shows a schematic view of an embodiment of the presently disclosed image processing system for motion segmentation.

FIG. 3 shows an example of an embodiment of the presently disclosed image processing system for motion segmentation (300). In this example the system for motion segmentation (300) comprises a camera (301) for capturing sequential image frames. The camera (301) comprises an image sensor (302). The system (300) further comprises a hardware block (303) in the form of an image processing pipeline (IPP) configured to perform various image processing tasks, including the presently disclosed method of motion segmentation (305), demosaicing (306) and noise filtering (307). In the example, a further processing unit in form of a CPU (304) is configured to perform (an) exposure algorithm(s) (308) and control settings of the image sensor (302) and/or camera (301).

Figure 4:
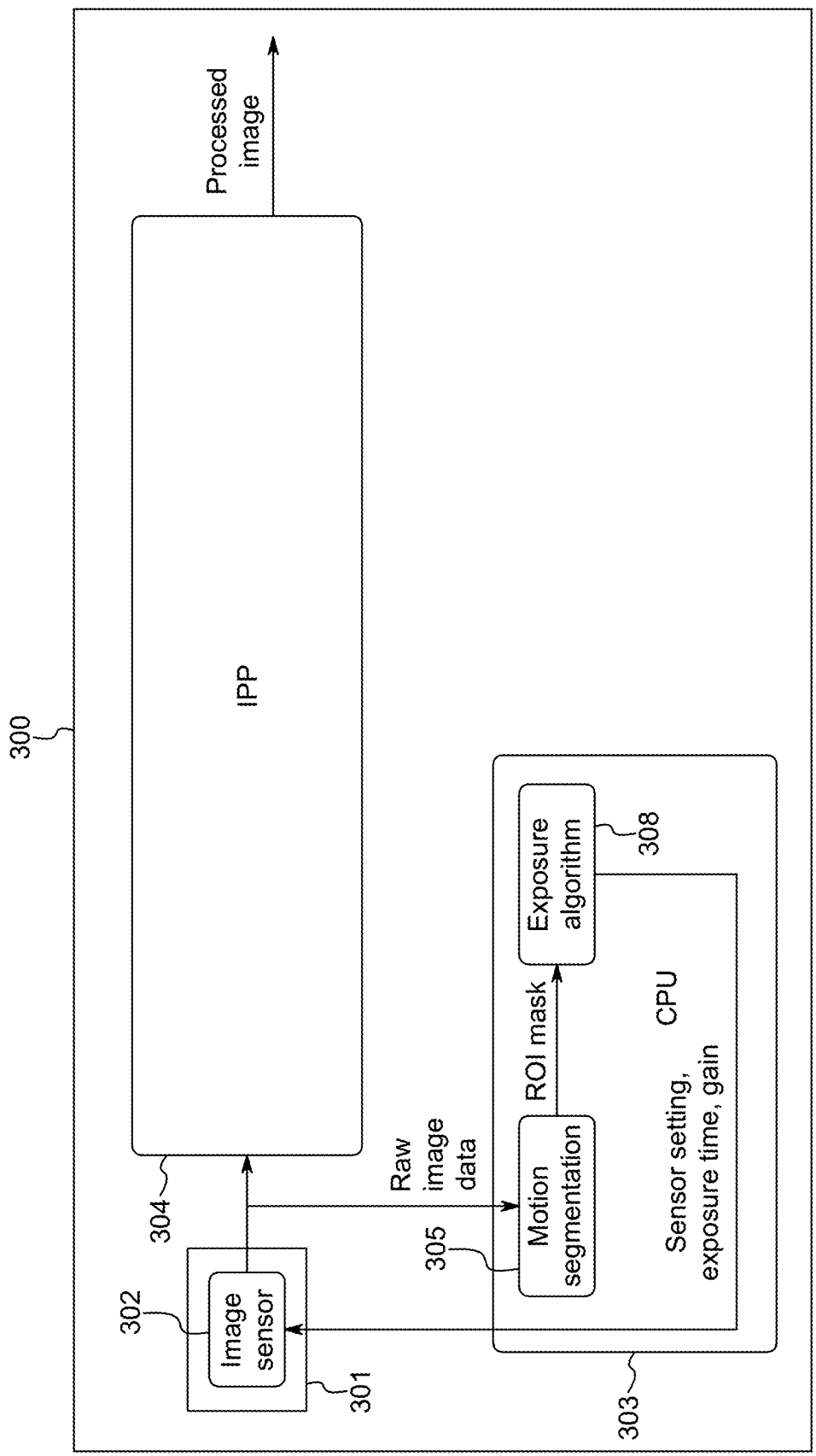
FIG. 4. shows a schematic view of a further embodiment of the presently disclosed image processing system for motion segmentation.

FIG. 4 shows a further embodiment of the presently disclosed image processing system for motion segmentation (300). In this example the system for motion segmentation (300) comprises a camera (301) for capturing sequential image frames. The camera (301) comprises an image sensor (302). The system (300) further comprises a processing unit (303) in the form of a central processing unit (CPU) configured to perform the presently disclosed method of motion segmentation (305) on raw image data from the image sensor (302). The motion segmentation (305) provides a region of interest (ROI) mask in the form of a motion mask, which is used in an exposure algorithm (308). The system (300) further comprises a hardware block (304) (IPP) for performing various image processing tasks. In this example there is no dedicated hardware, such as an accelerator, for motion segmentation in the IPP. Instead the motion segmentation (305) is performed in the CPU. The motion segmentation algorithm generates a motion mask comprising a region of interest that is used by an exposure algorithm (308).

FIG. 5 shows an example of a process of detecting motion between two image frames (401; 402). A first round of division, comparison and categorization is illustrated at the top half of the page. As can be seen, an object (409) in a scene moves between the first image frame (401) and the second image frame (402), which can, alternatively, be seen as a reference frame. The first image frame (401) is divided into four image blocks (403a; 403b; 403c; 403d). The second image frame (402) is divided into four corresponding image blocks (404a; 404b; 404c; 404d). The four image blocks are compared one by one. In the example this means that image block 403a is compared against image block 404a, image block 403b is compared against image block 404b, and so forth. In the example, two of the pairs of image blocks (403a/404a and 403b/404b) have dissimilarities (or dissimilarities greater than a threshold). For the two other pairs (403c/404c and 403d/404d) there is no motion. At the bottom half of the page one of the image block pairs (403a/404a) is now further processed. Typically, the second pair of image blocks having motion (403b/404b) will also be kept and further processed, which is, however, left out in the example. The pairs not having motion (403c/404c and 403d/404d) are discarded. At the bottom half of the page the image blocks 403a and 404a are now further divided into a new plurality of image blocks. Image block 403a, derived from the first image frame (401), is divided into four new image blocks (405a; 405b; 405c; 405d). Image block 404a, derived from the second image frame (402), is divided to four new image blocks (406a; 406b; 406c; 406d). The step of comparing the image blocks one by one is now performed for the new plurality of image blocks. As can be seen, in a comparison of image block by image block (405a against 406a, 405b against 406b etc.), two of the pairs of corresponding image blocks (405c/406c and 405d/406d) have motion whereas the other two pairs of corresponding image blocks (405a/406a and 405b/406b) do not have any motion. Based on this iterative process a resulting motion mask (407) comprising an area of movement (408) can be generated. In the example of FIG. 5 the resulting motion mask (407) shall be seen as an example. As can be seen the granularity of the motion mask is higher compared the sizes of the image blocks (405a-d/406a-d) after two rounds of divisions. The resulting motion mask (407) is composed by a number of black squares, which may correspond to the remaining image blocks having motion after a number of iterations. The example only shows two rounds of divisions. However, the resulting motion mask (407) is shown after further iterations, which explain the difference in granularity in FIG. 5.

Figure 6:
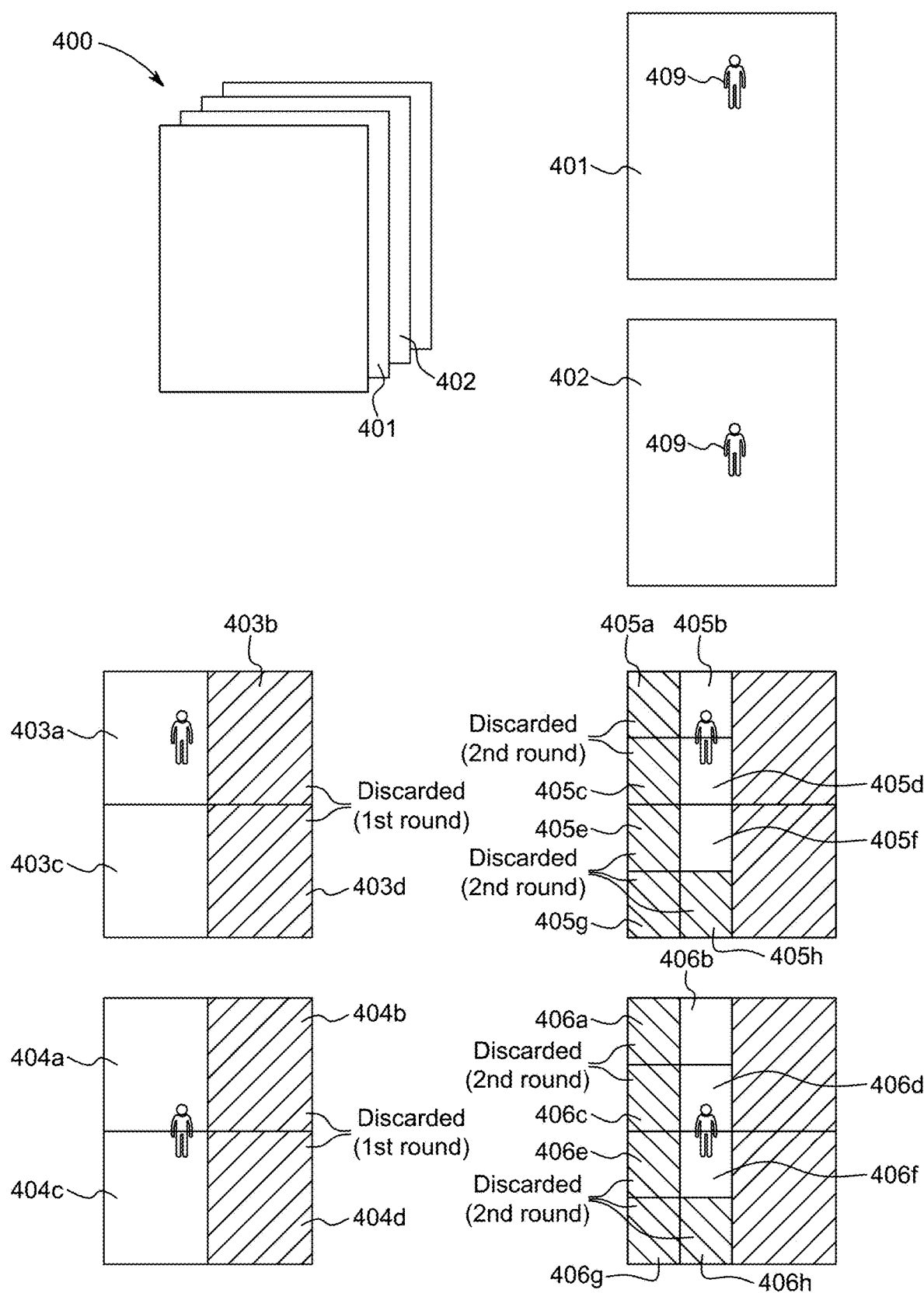
FIG. 6 shows a further example of a process of detecting motion between two image frames in a series of image frames.

FIG. 6 shows a further example of a process of detecting motion between two image frames (401; 402) in a series of image frames (400). The second image frame (402) may be an image frame temporally preceding the first image frame (401), or vice versa. As can be seen in the top half of the page, an object (409) in a depicted scene moves between the first image frame (401) and the second image frame (402). In the first round of division, comparison and categorization the first image frame (401) is divided into four image blocks (403a; 403b; 403c; 403d). The second image frame (402) is divided into four corresponding image blocks (404a; 404b; 404c; 404d). In the step of comparing the four image blocks are one by one it is found that two of the pairs have motion (403a/404a and 403c/404c). The other two of the pairs (403b/404b and 403d/404d) do not have motion and are therefore discarded, as illustrated by dashed areas in the figure. The pairs having motion (403a/404a and 403c/404c) are kept and further divided into a new plurality of image blocks in the second round. Image block 403a, derived from the first image frame, is divided to four new image blocks (405a; 405b; 405c; 405d). Image block 403c, also derived from the first image frame (401), is divided to four new image blocks (405e; 405f; 405g; 405h). Image block 404a, derived from the second image frame (402), is divided to four new image blocks (406a; 406b; 406c; 406d). Image block 404c, also derived from the second image frame (402), is divided to four new image blocks (406e; 406f; 406g; 406h). The step of comparing the image blocks one by one is now performed for the new plurality of image blocks. As can be seen, in the second round five of the pairs of corresponding image blocks (405a/406a; 405b/406b, 405e/406e; 405g/406g; 405h/406h) are discarded since they do not have any motion, whereas three pairs of corresponding image blocks (405b/406b; 405d/406d; 405f/406f) have motion. Based on the kept and discarded image blocks after the last iteration, a motion mask can be generated.

The invention claimed is:

1. A method of motion segmentation in a video stream, the method comprising the steps of:
   a) acquiring a sequence of images frames from a camera;
   b) dividing a first image frame from the sequence of image frames into a plurality of image blocks;
   c) for each image block of the plurality of image blocks, comparing the image block against a corresponding reference image block of a second image frame from the sequence of image frames to provide a measure of dissimilarity between the image block and the reference image block;
   d) for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the image blocks into a new plurality of image blocks;
   e) repeating steps c)-d) until a stop condition is met;
   f) generating a motion mask indicating areas of movement in the sequence of image frames based on the new plurality of image blocks; and
   g) performing further image processing, such as one or more of noise filtering, exposure and/or coloring, based on the motion mask.

2. The method of motion segmentation in a video stream according to claim 1, wherein the motion mask corresponds to the new plurality of image blocks of the last iteration of steps c)-d).

3. The method of motion segmentation in a video stream according to claim 1, wherein the second image frame is an image frame temporally preceding the first image frame, or wherein the second image frame is a reference image frame.

4. The method of motion segmentation in a video stream according to claim 1, wherein the step of comparing the image block against a corresponding reference image block of the second image frame comprises a pixel-to-pixel comparison, or a comparison of an average of groups of pixels, or a comparison of a sum of all pixels in the image block.

5. The method of motion segmentation in a video stream according to claim 1, wherein the step of further dividing the image blocks into a new plurality of image blocks is only performed for a selected number of image blocks, wherein the image blocks having the greatest measure of dissimilarity are selected.

6. The method of motion segmentation in a video stream according to claim 1, wherein step c) is only performed for a selected number of image blocks, wherein the image blocks within one or more predefined image areas are prioritized.

7. The method of motion segmentation in a video stream according to claim 1, wherein step c) is only performed for a selected number of image blocks, wherein the image blocks are prioritized based on predefined image features, such as at least one of predefined colors and patterns, of the image blocks.

8. The method of motion segmentation in a video stream according to claim 1, wherein the step of dividing the first image frame into a plurality of image blocks is performed based on predefined or configurable image block sizes, without analysis of the first image frame.

9. The method of motion segmentation in a video stream according to claim 1, wherein the first image frame, preferably also the second image frame, is/are unprocessed image sensor data.

10. The method of motion segmentation in a video stream according to claim 1, wherein the stop condition is a predefined number of iterations of steps c)-d), or wherein the stop condition is a maximum processing time.

11. The method of motion segmentation in a video stream according to claim 1, wherein the image processing method is repeated for a series of selected image frames and performed in substantially real-time.

12. A method of motion segmentation in image frames, the method comprising the steps of:
   a) dividing a first image frame into a plurality of image blocks;
   b) for each image block of the plurality of image blocks, comparing the image block against a corresponding reference image block of a second image frame to provide a measure of dissimilarity between the image block and the reference image block;
   c) for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the kept image blocks into a new plurality of image blocks; and
   d) repeating steps b)-c) until a stop condition is met; and providing a resulting motion segmentation indicating areas of movement in the image frames based on the new plurality of image blocks after the last iteration of steps c)-d).

13. An image processing system comprising:
at least one camera for capturing sequential image frames; and
a processing unit or a hardware accelerator configured to perform the steps of:
   i. acquiring a sequence of image frames from the camera;
   ii. dividing a first image frame from the sequence of image frames into a plurality of image blocks;
   iii. for each image block of the plurality of image blocks, comparing the image block against a corresponding reference image block of a second image frame from the sequence of image frames to provide a measure of dissimilarity between the image block and the reference image block;
   iv. for image blocks having a measure of dissimilarity less than a threshold: discarding the image blocks as being blocks with no or limited movement; and for image blocks having a measure of dissimilarity greater than the threshold: keeping the image blocks as being blocks with movement and further dividing the image blocks into a new plurality of image blocks; and
   v. repeating steps iii-iv until a stop condition is met and providing a resulting motion segmentation indicating areas of movement in the sequence of image frames based on the new plurality of image blocks.

14. The image processing system according to claim 13, wherein the processing unit or hardware accelerator or a further processing unit is configured to perform the steps of:
   vi. generating a motion mask based on the new plurality of image blocks; and
   vii. adjusting settings of the at least one camera, and/or performing further image processing, such as one or more of noise filtering, exposure and coloring, based on the motion mask.

15. A non-transitory computer program storage device having instructions which, when executed by a computing device or computing system, cause the computing device or computing system to carry out the method of motion segmentation in a video stream according to claim 1.

* * * * *